Aug. 31, 1954  E. HOPE  2,687,826
FASTENER RELEASE MEANS FOR RACEWAYS
Filed Dec. 1, 1951  3 Sheets-Sheet 1

Inventor
Ernest Hope
By his Attorney

Aug. 31, 1954     E. HOPE     2,687,826
FASTENER RELEASE MEANS FOR RACEWAYS
Filed Dec. 1, 1951     3 Sheets-Sheet 2
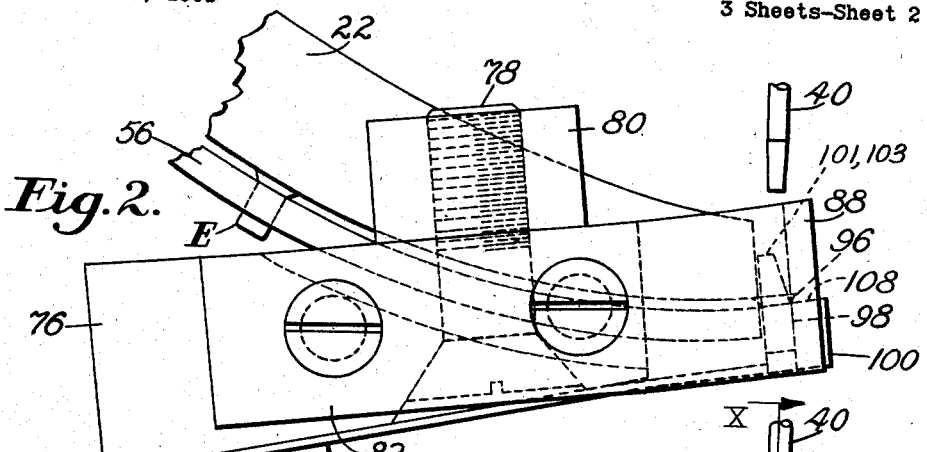
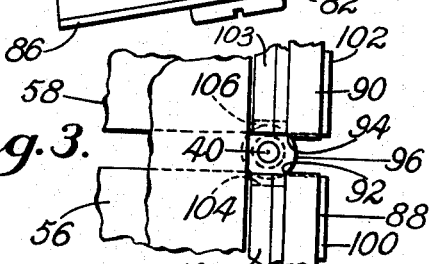
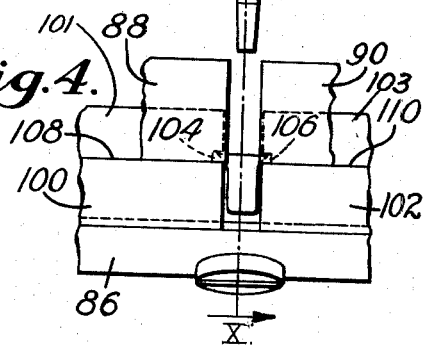
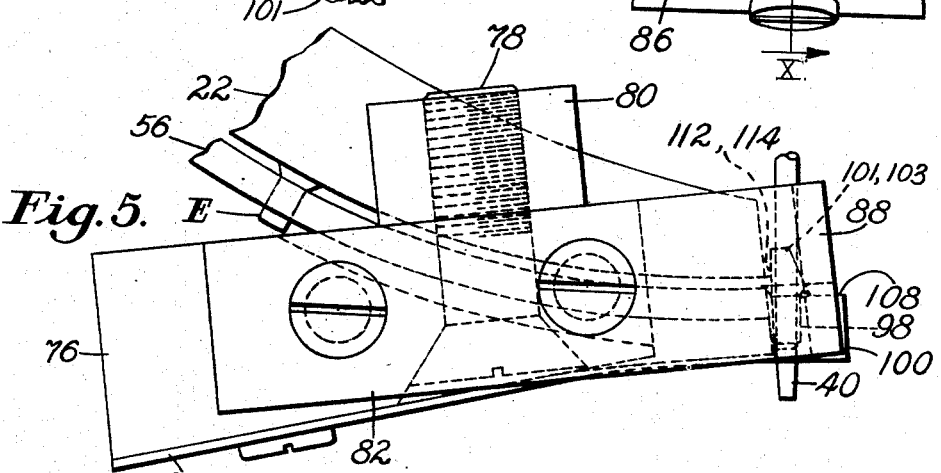
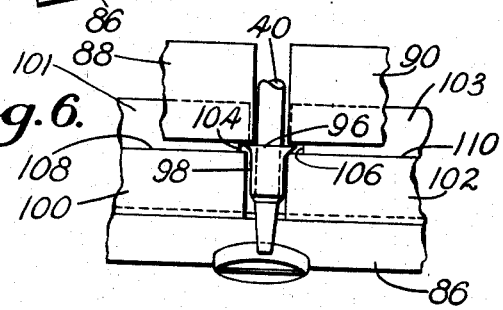
*Inventor*
Ernest Hope
By his Attorney

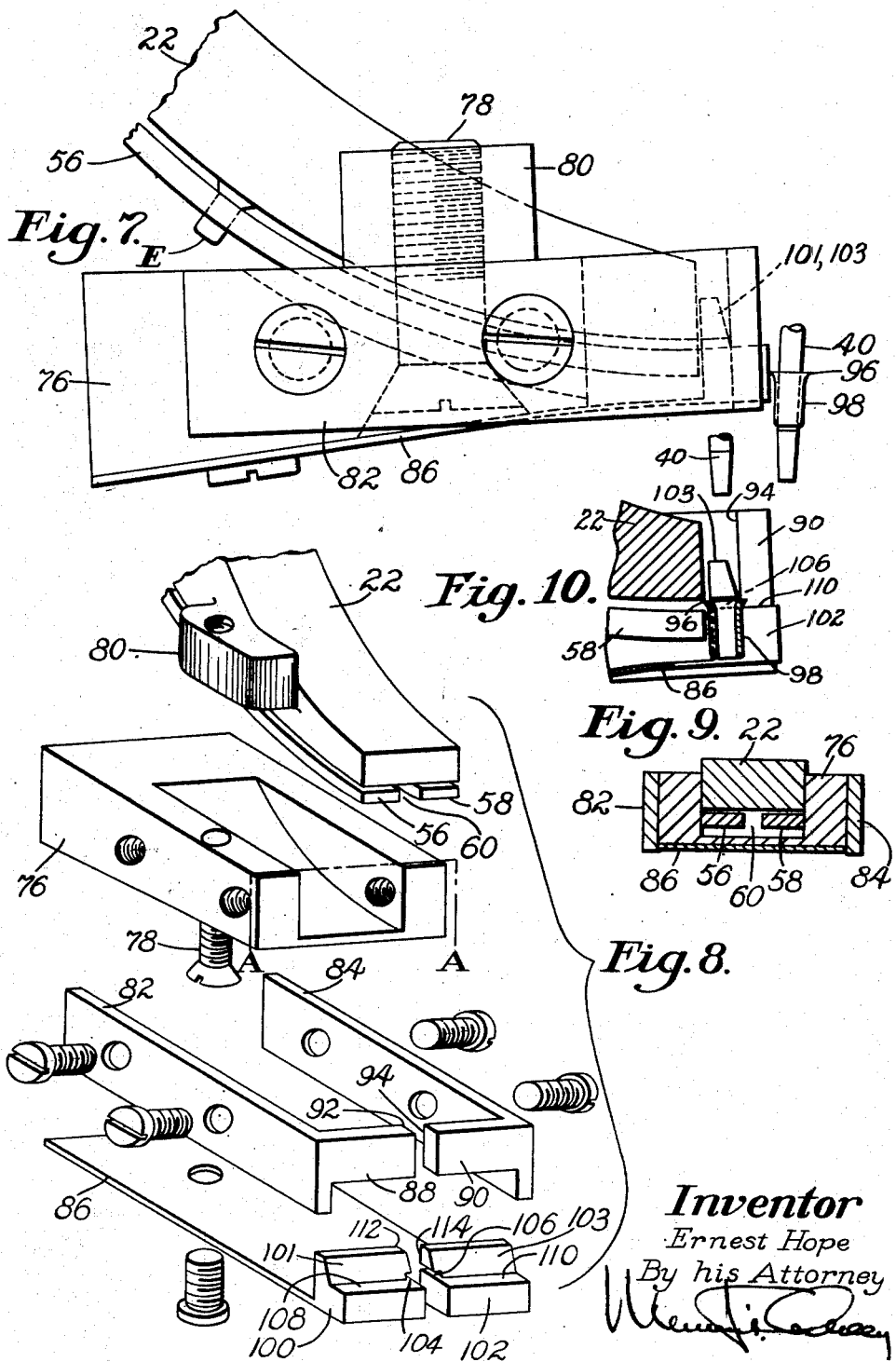

Patented Aug. 31, 1954

2,687,826

UNITED STATES PATENT OFFICE 2,687,826

FASTENER RELEASE MEANS FOR RACEWAYS

Ernest Hope, Leicester, England, assignor to United Shoe Machinery Corporation, Flemington, N. J., a corporation of New Jersey Application December 1, 1951, Serial No. 259,428

Claims priority, application Great Britain February 28, 1951

4 Claims. (Cl. 221—209)

This invention relates to fastener inserting machines and more particularly to the provision of improvements in their raceways when adapted to supply hollow barreled fasteners such as eyelets to the inserting instrumentalities.

Machines for inserting eyelets or other tubular fasteners normally employ a pair of cooperative upsetting tools and a raceway for delivering fasteners one at a time to one of those tools. As the delivery end of the raceway is swung in order to position the endmost fastener therein for transfer to said one tool the frequent practice is to have a pin project from that tool to impale the fastener and guide it to the upsetting surface, the raceway then receding to clear the tools for their clenching action which immediately follows. The usual means provided at the delivery end of a raceway for retaining the fasteners while stored in line therein, as well as for permitting their individual release therefrom on being impaled, comprises a pivotally mounted spring-backed lever the fastener detaining end of which is adapted to engage the outside of the barrel of the endmost fastener.

It will be apparent from the above brief description that removal of a fastener from the conventional raceway delivery end when the latter swings to one side is accompanied by the pin-impaled fastener exerting a force to pivot the retaining lever against resistance of its spring. This force may be of no moment when a machine is operating slowly or the fasteners are of relatively large diameter, but when higher operating speeds and/or rather small diameter barrels are involved which necessitate small diameter pins, the force tends to bend the latter and they frequently break. This unsatisfactory condition, prevalent especially when operating on electrical components, is aggravated by the bent, worn, or vibrant impaling pin being subjected, as it is, to axial pressure when it no longer centrally engages the other upsetting tool.

In view of the conditions noted it is an object of this invention to provide in a fastener inserting machine, a raceway having improved fastener retaining means effective satisfactorily to enable transfer to the operating tools of even the small diameter fasteners without danger of impairing the raceway or their means of transfer to said tools.

In accordance with this object a feature of the invention resides in providing, at the delivery end of a pivotal raceway, endmost fastener supporting means arranged and adapted to be yieldingly depressed during fastener impaling by a pin, means for swinging the delivery end of said raceway after said impaling, and fastener retaining means on the raceway arranged and adapted to permit relative passage of the pin with the impaled fastener, said retaining means offering little or no resistance to such passage.

The above and other features will become more clear from the detailed description which follows of an illustrative embodiment of the invention, pertinent portions of an eyeleting machine being selected for this purpose by way of example and not of limitation. In the accompanying drawings of the illustrative eyeleting machine, Fig. 1 is a front elevation, partly in section, of the head portion and raceway mechanism;

Fig. 2 is an enlarged view of novel eyelet retaining-releasing means mounted on the delivery end of the raceway seen in Fig. 1;

Fig. 3 is a plan view of parts shown in Fig. 2;

Fig. 4 is an end elevation of parts shown in Fig. 2, as viewed from the right;

Fig. 5 is a view similar to Fig. 2 but showing the parts in a later stage in the operation of the illustrative machine;

Fig. 6 is an end elevation of parts shown in Fig. 5, as viewed from the right;

Fig. 7 is a view similar to Figs. 2 and 5 but showing the parts in a still later stage of the operation of the machine;

Fig. 8 is an exploded view of the parts in perspective constituting the lower end of the improved raceway assemblage;

Fig. 9 is a section taken on the plane indicated by A—A in Fig. 8, assuming the parts assembled; and Fig. 10 is a view, partly in section, of the delivery end of the raceway and associated parts in their initial positions, taken on a vertical plane running along the center of the raceway passage and as viewed looking in the direction of the arrows X—X of Fig. 4.

Figure 1:
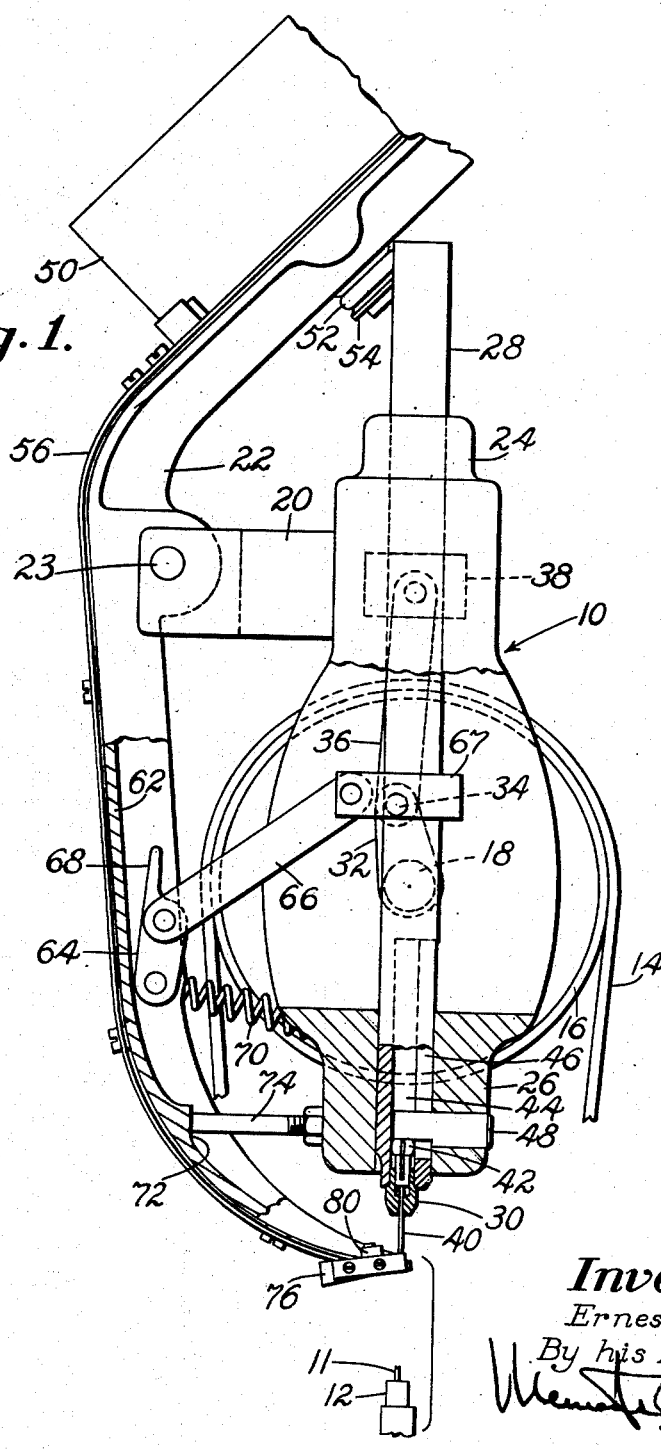

The illustrative machine may be floor or bench supported, an appropriate frame (not shown) being provided to support a machine head generally designated 10 (Fig. 1), and a fixed lower die 12. The latter has a central pilot projection 11. A suitable source of power such as an electric motor is connected by a belt 14 to drive a pulley 16 continuously, the pulley being arranged to rotate a drive shaft 18 mounted in the head 10 through appropriate one-revolution clutch mechanism under the control of an operator. Such mechanism forms no part of the present invention and accordingly is omitted from the drawings.

The head 10 comprises an arm 20 by which a raceway 22 is pivotally supported by a pin 23, and a pair of vertically alined bosses 24, 26 for reciprocably mounting a plunger 28. The lower end of the plunger 28 carries an upsetting or upper die 30 cooperatively related to the fixed lower die 12. For operating the plunger 28 a crank 32 is secured to one end of the shaft 18 and has pivotal connection in the form of a pin 34 with a link 36, the latter being pivotally connected to a collar 38 affixed to the plunger 28.

For impaling eyelets one at a time when they are supplied in line by the raceway 22, the die 30 carries a pin 40, sometimes known as a "nipple pin," the lower end of which is slightly tapered and of sufficiently small diameter to be received by the size of eyelet barrel to be installed. An upper portion 42 of the pin 40 is bifurcated and enlarged so as to bear frictionally on the wall of a bore 44 formed in the plunger 28. A slot 46 in the plunger slidably receives a stationary block 48, an inner end of which projects into the bore 44 thereby limiting upward movement of the pin 40 when the plunger 28 is being raised, as will hereinafter be described.

In conventional manner a hopper 50 mounted on the raceway 22 serves as a reservoir for the fasteners to be inserted, rotation of fastener agitating means in the hopper being effected by a belt and pulley arrangement 52, 54 to keep the raceway well supplied with eyelets represented by the single eyelet E (Figs. 2, 5 and 7). The raceway comprises curved thin plates 56, 58 arranged to support the eyelets by their flanges, the eyelet barrels being suspended in line in a raceway 60 between the plates. A web 62 (Fig. 1) of the raceway is spaced from the plates so as to allow passage of the heads of eyelets, yet prevent them from escaping their channel.

Mechanism for swinging the raceway 22 comprises a link 64 pivotally connected to the raceway and to a second link 66 having pivotal connection with a collar 67 secured to the plunger 28. The link 64 is provided with a projection 68 for a purpose hereinafter explained, and, when the machine is in normal inoperative condition as shown in Fig. 1, a tension spring 70 extending between the head 10 and the raceway 22 is effective yieldingly to hold a face 72 of the latter in abutting relation to an adjustable stop 74 extending from the head.

Referring to Figs. 2, 3, 4, 8 and 10 the novel eyelet retaining-releasing means are mounted on the lower end of the raceway 22 and comprise an adaptor block 76 secured by a screw 78 to a raceway boss 80. Affixed by screws threaded into the adaptor block 76 are a pair of retaining bars 82, 84 (Fig. 8) and a depressible leaf spring 86. End portions 88, 90 respectively of the bars 82, 84 project inwardly of the raceway and are spaced apart to allow relative sidewise movement of the pin 40. Upright rear edges 92, 94 of the end portions 88, 90 respectively, normally engage a head flange 96 of the endmost raceway eyelet having a barrel 98. Integral with the leaf spring 86 is a pair of spaced blocks 100, 102 provided with upstanding walls 101, 103 respectively, and these walls are provided with opposed grooves 104, 106 each having a lower face elevated above the spring 86 a distance sufficient to position said face flush with the upper face of the raceway plates 56, 58 respectively when spring 86 is in its elevated position, whereby the grooves 104, 106 are adapted to receive the head flange 96 when the endmost eyelet is cooperatively supported by the blocks 100, 102. When the spring 86 is in its upper or normal position (Figs. 2 and 10), projecting surfaces 108, 110 of the blocks abut under-surfaces of the end portions 88, 90 respectively. When in their depressed positions (Fig. 5) as hereinafter described, the blocks 100, 102 respectively have upright rear edges 112, 114 adapted to engage, and thereby retain in the raceway, an eyelet next to become endmost.

In operating the machine the parts at the beginning of a cycle have the relative positions shown in Fig. 1, the stop 74 having been adjusted, as appropriate to the size of eyelets in the hopper 50, to coaxially aline the endmost eyelet (when its flange 96, resting on the lower faces of grooves 104, 106, is engaged by the edges 92, 94, the ends of which edges are in contact with faces 108, 110, as seen in Fig. 10) with the pin 40 and the pilot projection 11. The workpiece to be eyeleted having been positioned with a perforation receiving the projection 11, the clutch mechanism is actuated to permit one revolution of the shaft 18 and accordingly one upsetting and return stroke of the plunger 28. The link 64 is thereby first caused to be moved counterclockwise about its pivotal connection with the raceway (as seen in Fig. 1) until the projection 68 engages the web 62. In this initial interval the raceway 22 does not move, and the retaining means attached thereto maintain the endmost eyelet barrel 98 alined with the downwardly moving pin 40 for impaling action by the latter. Further downward movement of the plunger 28 causes the projection 68 to bear on the web 62 so as to swing the raceway 22 and eyelet retaining means clockwise (as seen in Fig. 1) about the pin 23, away from the path of the upsetting die 30, and against the resistance of the tension spring 70. It is important to note that as the die 30 initially descends, the tapered pin 40, by reason of its frictional engagement with the bore 44, is thrust through the endmost eyelet barrel 98 before the raceway delivery end and retaining means is made to recede, the relative positions of the raceway and retaining means and their alinement with the axis of the pin 40 being as shown in Figs. 2, 4 and 10. The still descending pin 40, due to its frictional engagement with the inside of the barrel 98, overcomes the upward thrust of the spring 86 and, acting through the eyelet flange 96, which pushes down upon the bottom faces of the grooves 104, 106, depresses the blocks 100, 102 simultaneously and relatively to the raceway 22 (Figs. 5 and 6). It will be recognized that the spring 86 is strong enough to support the eyelet against gravity and to afford resistance adequate to permit the pin 40 to be thrust into the eyelet sufficiently tight to prevent their separation after the raceway recedes; but the spring 86 is not strong enough to thrust the pin 40 upwardly in the bore 44. Consequentially continued downward movement of the pin 40 displaces the spring 86 and block portions 100, 102, causing the rear edges 112, 114 to be positioned in the path of the next-to-become-endmost eyelet, thus forming an abutment against which opposite peripheral portions on the flange of said eyelet will bear to prevent the said eyelet from passing down and out of the raceway.

With the blocks 100, 102 depressed relatively to the portions 88, 90 pivotal movement of the raceway and retaining means commences, the bars 82, 84 receding from a relationship slightly above the endmost eyelet flange 96. The only resistance offered to the removal of the endmost eyelet from the raceway, which resistance is exerted transversely of the pin 40, is due to the small amount of friction developed between the eyelet flange 96 and the surfaces on which it rides, namely the lower portions of the grooves 104, 106 and the surfaces 108, 110. Consequently the sidewise bending force on the pin 40 is only a fraction (perhaps about one tenth) of the upward force of the blocks 100, 102 on the eyelet being transferred for upsetting by the dies 30 and 12. In contrast with conventional means provided at the delivery ends of raceways, no pressure by the portions 88, 90 restrains release of the endmost eyelet from the raceway 22 when the latter is swung sidewise. Continued descent of the die 30 occurs after the pin 40 is clear of the raceway (Fig. 7) causing said pin to engage the pilot projection 11 endwise. The pin 40 thereupon relatively slides upwardly in the bore 44, the die 30 then engaging the impaled eyelet and thrusting it into the hole in the workpiece for upsetting. When the die 30 is raised from the cooperative lower die 12 the upper portion 42 of the pin 40 is carried upward until its movement is limited by engagement with the block 48. Thus, at the end of the cycle the pin 40 again projects from the die 30 and the raceway 22 will have swung back to initial position under the influence of the spring 70, but an eyelet will not as yet be impaled.

What is claimed as new and desired to be secured by Letters Patent of the United States is:

1. In a fastener inserting machine of the type having a pair of cooperative upsetting tools one of which is provided with fastener impaling means, a raceway having its delivery end movable toward and from the operative path of said one upsetting tool, fastener retaining means fixedly mounted on said delivery end, and fastener release means yieldingly mounted on said delivery end, portions of said retaining means and said release means respectively being spaced to permit relative movement of said impaling means and said retaining and release means between said spaced portions with an impaled fastener, and said release means being actuable by the thrust of the fastener and said impaling means during said relative movement.

2. In an eyeleting machine of the type having a pair of cooperative upsetting tools one of which is provided with eyelet impaling means, a raceway having its delivery end movable toward and from the operative path of said one upsetting tool, eyelet retaining members fixedly mounted on said delivery end, eyelet release means normally cooperatively related to said members for supporting the endmost eyelet in an elevated position wherein the members engage the supported eyelet to retain it in the path of said impaling means, and mechanism for operating the impaling means before said delivery end recedes from the vicinity of said operative path, said impaling means being effective to impale the endmost eyelet and free it from said retaining members by relatively depressing said release means.

3. In an eyeleting machine of the type having a pivotal raceway from which eyelets in line are supplied one at a time to the upsetting action of one of a pair of cooperative upsetting dies, eyelet impaling means telescopically related to said one die and arranged and adapted initially to be thrust downward into frictional engagement with the barrel of the endmost eyelet of said line of eyelets and then to exert a depressing force upon said eyelet, a yieldingly depressible member on the raceway disposed normally to slidably support said endmost eyelet by contact with its head, means secured to the delivery end of the raceway and adapted to engage the head of said endmost eyelet when supported by the member in non-depressed condition whereby the line of eyelets is retained, and mechanism for swinging said raceway sidewise after said member has been depressed by the operation of said impaling means, an upper portion of said depressible member, simultaneously with said depression, being engageable with the eyelet next to become endmost to detain it in the raceway.

4. A raceway for delivering eyelets one at a time comprising retaining bars fixedly spaced on the raceway delivery end to engage opposite sides of the head of an endmost eyelet, and a yieldingly depressible release member mounted on the raceway delivery end, said member having grooved end portions adapted to receive and support the head of the endmost eyelet prior to and during its transfer from the raceway, said end portions normally and respectively abutting the retaining bars to enable the bars to retain the eyelets in the raceway but said end portions being depressible away from said bars whereupon the bars no longer engage with the endmost eyelet, edges of said member above said end portions being engageable with the eyelet next to become endmost when said member is depressed whereby only said endmost eyelet is released.

No references cited.